United States Patent [19]

Bisping

[11] 4,114,241
[45] Sep. 19, 1978

[54] INTERLOCKING CLAMPS FOR PIPING AND CABLE

[75] Inventor: Heinz Bisping, Munich, Germany

[73] Assignee: Hilti Aktiengesellschaft, Schaan, Liechtenstein

[21] Appl. No.: 798,937

[22] Filed: May 20, 1977

[30] Foreign Application Priority Data

May 31, 1976 [DE] Fed. Rep. of Germany ....... 2624333

[51] Int. Cl.² .............................................. F16L 3/22
[52] U.S. Cl. ..................................... 24/81 CC; 24/83; 248/68 CB
[58] Field of Search ........................... 24/81 CC, 83; 248/68 CB, 74 A, 229; 138/112; 403/331

[56] References Cited

U.S. PATENT DOCUMENTS

| | | | |
|---|---|---|---|
| 3,188,030 | 6/1965 | Fischer | 248/68 CB |
| 3,387,343 | 6/1968 | Fitz-Gerald | 248/68 CB |
| 3,747,166 | 7/1973 | Eross | 24/81 CC |
| 3,856,246 | 12/1974 | Sinko | 248/68 CB |

Primary Examiner—Louis K. Rimrodt
Attorney, Agent, or Firm—Toren, McGeady and Stanger

[57] ABSTRACT

To interconnect clamps used for holding pipe, cable and the like, a detent is provided extending outwardly from one side surface of the clamp while a complementary opening is formed in the opposite side surface. The detent fits into the opening formed in another clamp for securing the two clamps together. The detents are shaped to provide a releasable interfit with the openings. Each side surface can include both a detent and an opening. The detents and openings or recesses can be provided at the junction of the side walls and base of the clamps.

13 Claims, 5 Drawing Figures

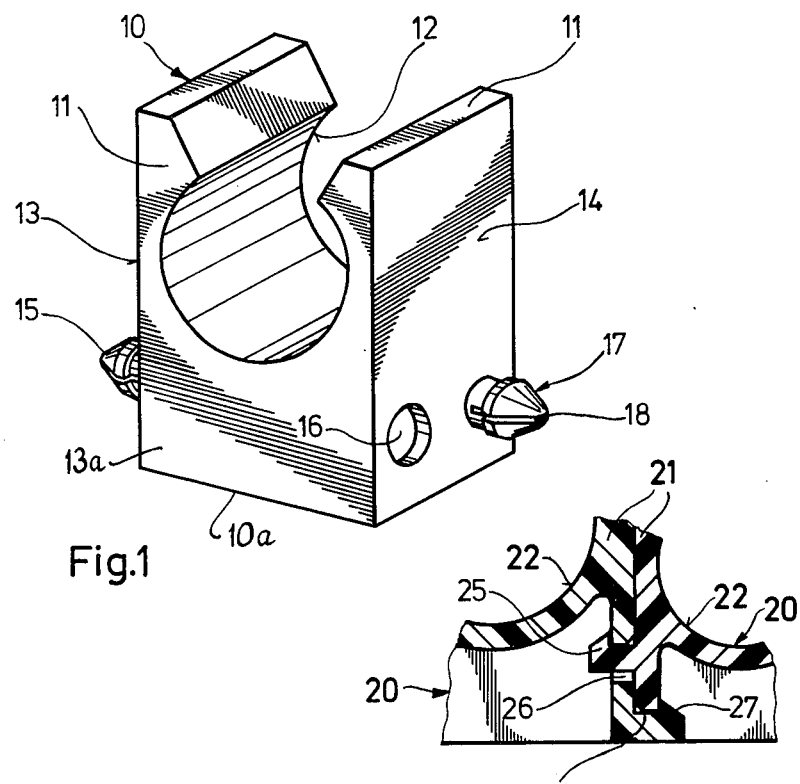
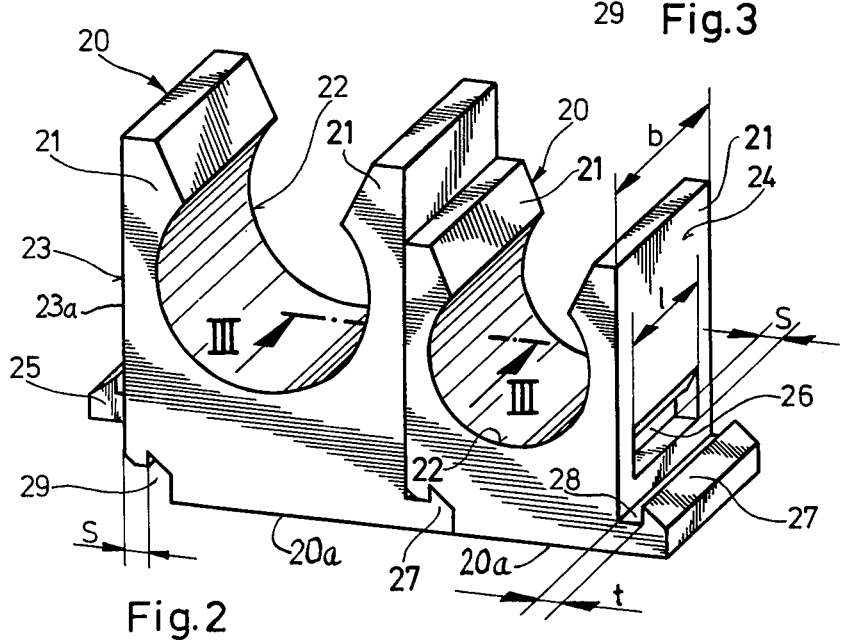

INTERLOCKING CLAMPS FOR PIPING AND CABLE

SUMMARY OF THE INVENTION

The present invention is directed to a clamp having an opening for holding pipe, cable and the like and, more particularly, it is directed to the arrangement of the clamps so that they can be interconnected. Preferably, the means interconnecting the clamps are located on their side walls which extend generally parallel with the axis of the opening through the clamp for receiving pipe, cable and the like.

Where a plurality of pipes or cables extend in side-by-side relation it is known to use a so-called clamp strap. If several lines of cable are to be arranged parallel to one another, it is customary to hold the clamps in a generally C-shaped sectioned bar. In this way it is not necessary to fasten individual clamps to the ground. The clamps must be secured, however, against lateral displacement and against falling out of the sectioned bar. Therefore, the clamps were provided on the side walls which extend parallel to the axis of the receiving opening in the clamp with means for interconnection with other clamps.

Such interconnections have included dove-tailed guides so that the individual clamps can be assembled together perpendicularly to the bearing surface. In another embodiment the side walls of the clamps are provided with a bead or a corresponding recess, so that the clamps can be assembled together parallel to the axis of the pipe or cable which they hold.

These known clamps have the drawback, however, that the individual clamps can be assembled together only outside of a sectioned bar, since the bar only permits movement in its longitudinal direction, that is, transverse to the axial direction of the opening for the pipe or cable. Furthermore, these known clamps have the disadvantage that there is insufficient holding power in the direction of the assembly.

Therefore, it is a primary object of the present invention to provide clamps which can be interconnected, insuring a firm hold between one another and permitting the interconnection within a sectioned bar.

In one embodiment according to the present invention, one side wall of a clamp has an outwardly extending detent and the opposite side wall has an opening suitable to receive a complementary detent. The detent and opening in the clamp can inter-engage with complementary interconnecting means on other similarly shaped clamps when the side walls are moved toward one another. In such a clamp construction, the individual clamps can be assembled in a row by movement parallel to their bases and perpendicular to the axis of the pipe or cable openings through the clamps. Such an assembly can be effected inside the channel formed in a sectioned bar. The interconnection of the clamps inside the sectioned bar has particular advantages in any subsequent changes in the arrangement of the members being held by the clamps. Accordingly, individual clamps can be removed from the sectioned bar or added without affecting the other clamps held in the bar. The use of a sectioned bar is not absolutely necessary, however, since the clamps are firmly interconnected with one another even without using a sectioned bar.

To simplify assembly of the clamps, it is advantageous if each side wall has at least one detent and one opening. If the detent and opening in each side wall of the clamp are arranged side by side and the clamp is formed symmetrically, it can be introduced into a sectioned bar at random and assembled with an adjacent clamp. With this arrangement it is not possible to introduce the clamps so that they do not interfit. Such an arrangement can save valuable assembly time.

In securing clamps together it is advisable if the openings in the clamps contain a resilient hook. Such a hook permits the separation of the two functions which might otherwise be performed by the opening alone, that is, the function of guiding a detent on one hand and of holding or interconnecting with the detent on the other hand. By using a resilient hook it is possible to shape and position the opening and the hook for optimum effectiveness. By suitably dimensioning the hook, it is possible to maintain its holding power within certain limits. If the holding power of the hook is exceeded then the clamps can be pulled apart, since the hooks yield laterally from inter-engagement with the detents affording disassembly of the individual clamps without the use of tools.

To afford a tight interconnection of individual clamps, it is advantageous if each detent includes a groove extending parallel to the side wall from which it extends with the groove having a width corresponding to the thickness of the side wall. Such an arrangement insures positive inter-engagement and a correspondingly strong holding power.

For absorbing any turning and tilting moments acting on the clamp, it is advisable if the detent is strip-shaped and the opening has a complementary slot-shape. Such a design of the detents and openings has a favorable effect in manufacture, since any harmful effects due to manufacturing tolerances can be adequately compensated. Further, a strip-shaped detent is much stronger than a pin-shaped detent and does not show any signs of fatigue after being repeatedly interconnected and separated.

In some applications the clamps must be joined to one another without the use of a sectioned bar. In such a case it is advantageous if the length of the strip-shaped detent and of the slot-shaped opening is less than the width of the side wall. Such an arrangement insures the interconnection of the clamps in all directions. Further, with such an arrangement there is practically no decrease in the strength of the clamp body.

When pipe or cable is pressed into a clamp, the clamp legs formed by the side walls, are widened elastically and return into their original position after the pipe or cable has been completely inserted. To limit any effect on the elasticity of the clamp, the interconnecting means should be positioned as closely as possible to the base of the clamp. Accordingly, in a preferred embodiment the detent and its complementary opening are located at the junction of the base and side wall of the clamp. As a result, the interconnecting means are located in the portion of the clamp which is not deformed during the insertion of the pipe or cable whereby the assembly of the clamps and their interconnection is greatly facilitated. In the formation of plastic clamps, this particular arrangement simplifies the production of the clamp.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments.

BRIEF DESCRIPTION OF THE DRAWING

In the drawing:

FIG. 1 is a perspective view of one embodiment of a pipe or cable clamp incorporating the present invention;

FIG. 2 is a perspective view of another embodiment of the invention showing two clamps interconnected to one another;

FIG. 3 is a partial sectional view taken along the line III—III in FIG. 2;

DETAILED DESCRIPTION OF THE INVENTION

Figure 4:
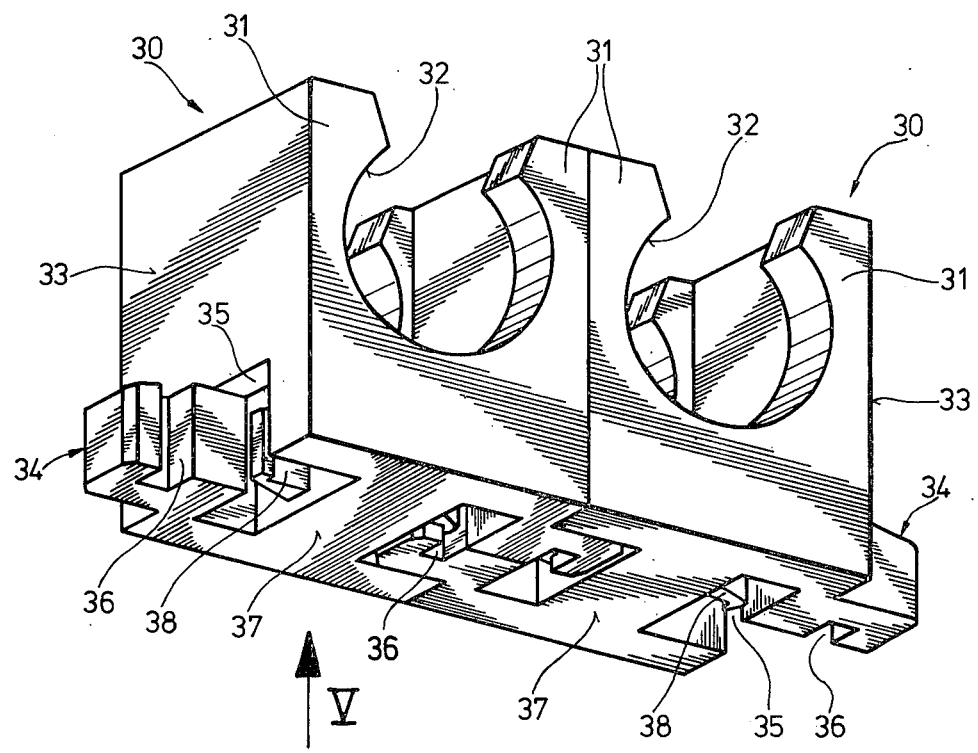
FIG. 4 is a perspective view of another embodiment of the invention illustrating two interconnected identical clamps.

In FIG. 1, one embodiment of a clamp 10 for pipe, cable or the like, is illustrated. The clamp has a rectangularly shaped base 10a with a pair of oppositely spaced elastic legs 11 extending upwardly from the base. The inwardly facing surfaces of the legs 11 form, in combination with the base, a receiving opening 12 for holding the pipe or cable. The exterior of the clamp, above the base 10a, is defined by an oppositely disposed pair of side walls 13, 14 extending generally parallel with the axis of the opening 12 and a pair of end walls 13a extending between the side walls and forming the ends of the opening 12 through the clamp. Projecting outwardly from side wall 13 is a detent 15. On the opposite side wall 14 and aligned generally opposite the detent 15 is a complementary opening 16. The detent 15 is shaped to interconnect with a corresponding opening 16 in another clamp so that a plurality of similarly shaped clamps can be suitably interconnected. In FIG. 1 only the detent 15 can be seen on the side wall 13, however, on the side wall 14 it can be noted that a detent 17 is provided spaced laterally from the opening 16. Detents 15 and 17 are identical in shape and are arranged symmetrically on the opposite side walls 13, 14. With this arrangement, individual clamps 10 can be assembled together at random. Due to their symmetrical arrangement it does not matter which side wall of a clamp is placed against the side wall of another clamp, because their symmetrical arrangements will permit interconnection. To facilitate the assembly of the clamps together, the detents 15, 17 are each provided with a slit 18 extending radially of the detent and also extending in the axial direction of the detent, that is, in the direction outwardly from the side wall. The slit 18 permits the detents to yield in the radial direction for facilitating the passage of the detent into a complementary opening.

In FIG. 2, two clamps 20 are shown interconnected with one another. While the clamps 20 have the same general configuration, their heights are different and they are arranged to receive different sizes of pipe or cable. Each of the straps has a rectangularly shaped base 20a and a pair of laterally spaced elastic legs 21 extending upwardly from the base. The inwardly facing surfaces of the legs 21 define an opening 22 for holding a pipe or cable. Each of the clamps 20 has a pair of laterally spaced side walls 23, 24 with the side walls extending parallel to the axis of the opening 22 through the clamp. In FIG. 2 the side wall 23 on the left-hand clamp 20 has an outwardly extending detent 25. Unlike the arrangement shown in FIG. 1, detent 25 is strip-shaped and extends for only a portion of the width between the opposite upwardly extending edges 23a of the side wall. The opposite side wall 24 is provided with a complementary slot-shaped opening 26, note the side wall 24 in the right-hand clamp of FIG. 2. Though it is not illustrated in FIG. 2, the abutting side walls 23, 24 of the clamps 20 have a complementary detent 25 and opening 26, respectively, for interconnecting the clamps. This arrangement permits additional guidance of the clamps in the axial direction of the receiving opening 22. At the junction of the base 20a and the side wall 24, another detent 27 is provided extending laterally outwardly from the base and side wall. Detent 27 extends for the entire width b of the side wall 24 and includes a groove 28 which adjoins the side wall and extends parallel to it. The groove 28 has a width t having the same dimension as the thickness s of the side wall 24. Along the opposite side wall 23, at its junction with the base 20a is an opening 29 having a shape corresponding to the shape of the detent 27. As can be seen at the base of the side wall 23 of the left-hand clamp 20, the groove 29 has a land and groove effect along its upper side with the land having a width S corresponding to the thickness S of the side wall 23.

In FIG. 3, a partial section through the clamps 20 is taken along the line III—III in FIG. 2. In this figure it can be seen that the detent 25 inter-engages the opening 26 while the detent 27 engages the opening 29. To facilitate the interconnection of the clamps 20, the edges of the detents 25, 27, as well as the edges of the openings 26, 29 are bevelled. For disengaging the clamps from one another, the detents must be removed from engagement with the corresponding openings and a tool is used in this embodiment.

In FIG. 4, two identically shaped and sized clamps 30 are illustrated embodying the present invention. Each clamp 30 has a base 37 and a pair of laterally spaced elastic legs 31 extending upwardly from the base. The legs 31 define an opening 32 between them for receiving the pipe or cable with the axis of the opening corresponding to the axis of the pipe or cable to be positioned in it. Each clamp has a pair of side walls 33 extending generally parallel to the axis of the receiving opening 32. Each side wall includes an outwardly extending detent 34 and an opening projecting into the combination of the side wall 33 and the base 37. Each detent 34 is provided with a groove 36 extending parallel to the adjacent side wall 33 and being substantially perpendicular to the base 37. To secure the clamps together, each of the openings 35 includes a resilient hook 38 secured to the body of the clamp and extending toward the adjacent detent. The hooks are resilient and permit the interconnected clamps to be disconnected without the use of tools.

Figure 5:
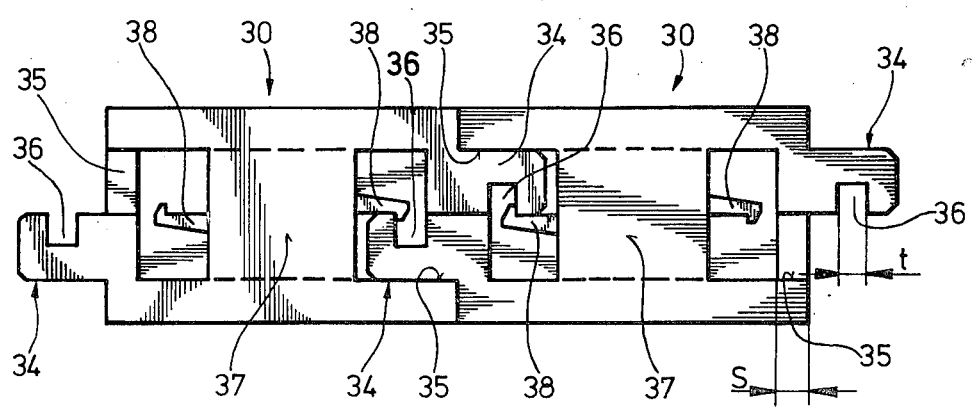
FIG. 5 is a bottom view of the clamps shown in FIG. 4, the view being taken in the direction of the arrow V in FIG. 4.

FIG. 5 provides a bottom view of the clamps 30 shown in FIG. 4, that is, the view is taken in the direction of the arrow V. As can be seen in FIG. 5 the detents 34 extending from the opposite side walls 33 of each clamp 30 are offset relative to one another. The engagement of the detents 34 in the openings 35 of adjacent clamps can be especially appreciated from this bottom view. The resilient hooks 38 located in each of the openings 35 engage in the grooves 36 as the clamps are fitted together. By applying a certain pulling force to the interconnected clamps, the resilient hooks 38 yield laterally and permit the disengagement of the clamps without the use of any tools.

As can be seen in FIG. 3 the clamps are formed of plastic or a similar material which permits the releaseable inter-engagement of the detents and the openings. Other materials suitable for providing such inter-engagement can be used in forming the clamps.

While specific embodiments of the invention have been shown and described in detail to illustrate the application of the inventive principles, it will be understood that the invention may be embodied otherwise without departing from such principles.

What is claimed is:

1. A clamp for holding pipe, cable and the like, said clamp comprising a pair of side walls each having an outwardly facing surface directed in the opposite direction to the outwardly facing surface of the other side wall and an inwardly facing surface directed toward the inwardly facing surface of the other said side wall, and a base interconnecting said side walls, each said side wall having a pair of spaced edges extending upwardly from said base, the inwardly facing surfaces of said side walls and said base forming an opening for holding pipe, cable and the like and the opening having an axis extending generally in the direction from one upright edge to the other upright edge of one of said side walls, wherein the improvement comprises that one said side wall having a detent extending outwardly from the outwardly facing surface thereof and the other said side wall having an opening in the outwardly facing surface thereof for receiving a corresponding said detent so that said clamp can be interlocked with other said clamps by inserting said detent in a direction perpendicular to said side wall into a corresponding said opening on another said clamp and by inserting said detent on still another said clamp into the opening on said clamp.

2. A clamp, as set forth in claim 1, wherein each said side wall having at least one said detent and one said opening therein disposed in spaced relation.

3. A clamp, as set forth in claim 2, wherein said detent extending outwardly from said wall and being aligned with said opening therein, and said detents on opposite side walls of said clamp being offset relative to one another.

4. A clamp, as set forth in claim 3, wherein a resilient hook formed on said clamp within said opening and extending toward and spaced inwardly from said detent located aligned with said opening, said detent being grooved and said resilient hook being releasable engageable with the groove in said detent on another said clamp.

5. A clamp, as set forth in claim 4, wherein said opening being formed in both said side wall and said base and said detent extending outwardly from said side wall and said base.

6. A clamp, as set forth in claim 1, wherein a resilient hook being formed in the opening in said side wall and arranged for releasably engaging said detent inserted into said opening.

7. A clamp, as set forth in claim 1, wherein said detent having a groove formed therein extending parallel to said side wall from which said detent extends and said groove having a width of the same dimension as the wall thickness of said side wall.

8. A clamp, as set forth in claim 1, wherein said opening being slot-shaped and extending in the direction between the opposite said upwardly extending edges of said side wall, and said detent having a shape complementary to and arranged to interfit in said opening in another said clamp.

9. A clamp, as set forth in claim 8, wherein said slot and said detent each having a dimension extending in the direction between said upwardly extending edges of said side wall in which they are formed which is less than the dimension between said upwardly extending edges.

10. A clamp, as set forth in claim 1, wherein said detent and opening being spaced upwardly from the junctions of said side walls with said base, a second detent formed on and extending outwardly from the junction of one of said side walls and said base and a recess formed in the junction of the other one of said side walls and said base with said second detent being shaped for interfitting within a corresponding said recess in another said clamp.

11. A clamp, as set forth in claim 10, wherein said second detent extends outwardly from said side wall having said opening therein and said recess formed in the lower end of said side wall having said detent thereon.

12. A clamp, as set forth in claim 1, wherein said opening being circular and said detent having a circular cross section and having a portion thereof with a greater diameter than said opening.

13. A clamp, as set forth in claim 12, wherein said detent having a radially extending slit therein with said slit also extending in the direction of said detent from the end thereof outwardly from said side wall toward said side wall so that said detent can be radially compressed because of said slit for fitting into said opening in another said clamp.

* * * * *